US007636361B1

(12) United States Patent
Ebergen et al.

(10) Patent No.: US 7,636,361 B1
(45) Date of Patent: Dec. 22, 2009

(54) APPARATUS AND METHOD FOR HIGH-THROUGHPUT ASYNCHRONOUS COMMUNICATION WITH FLOW CONTROL

(75) Inventors: Jo C. Ebergen, San Francisco, CA (US); Justin M. Schauer, Palo Alto, CA (US); Robert D. Hopkins, Hayward, CA (US); Ivan E. Sutherland, Santa Monica, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 618 days.

(21) Appl. No.: 11/242,113

(22) Filed: Sep. 27, 2005

(51) Int. Cl.
*H04L 12/28* (2006.01)
(52) U.S. Cl. .................... 370/395.4; 370/236
(58) Field of Classification Search .................. 370/401, 370/412, 465, 390, 236, 468, 395.4; 325/38; 379/399; 711/118, 119; 712/244
See application file for complete search history.

(56) References Cited

U.S. PATENT DOCUMENTS

| 3,913,016 | A  | * | 10/1975 | Candy ......................... 375/244 |
| 6,233,248 | B1 | * | 5/2001  | Sautter et al. ................ 370/465 |
| 6,381,692 | B1 | * | 4/2002  | Martin et al. ................. 712/244 |
| 6,714,517 | B1 | * | 3/2004  | Fawaz et al. ................. 370/236 |
| 6,836,546 | B1 | * | 12/2004 | Willer ..................... 379/399.01 |
| 7,002,966 | B2 | * | 2/2006  | Gregg et al. ............. 370/395.4 |
| 7,035,264 | B2 | * | 4/2006  | Seki et al. ................ 370/395.4 |
| 2002/0053004 | A1 | * | 5/2002  | Pong ........................... 711/119 |
| 2003/0172231 | A1 | * | 9/2003  | Ebergen ...................... 711/118 |
| 2005/0089054 | A1 | * | 4/2005  | Ciancaglini et al. ......... 370/412 |
| 2005/0238032 | A1 | * | 10/2005 | Hesse .......................... 370/401 |

* cited by examiner

*Primary Examiner*—Kwang B Yao
*Assistant Examiner*—Syed Bokhari
(74) *Attorney, Agent, or Firm*—Park, Vaughan & Fleming LLP (57) ABSTRACT

One embodiment of the present invention provides a system that asynchronously controls sending data items from a sender to a receiver. This system includes a set of sending FIFOs, a set of receiving FIFOs, as well as a shared data path between the sender and the receiver. The system also includes a set of control paths that operate in parallel between the sender and the receiver, wherein a given control path controls the transmission of data items between a corresponding sending FIFO and a corresponding receiving FIFO through the shared data path. The system further includes a round-robin scheduling mechanism which activates one control path at a time in a predetermined sequence. An activated control path asynchronously controls the sending of a data item from a corresponding sending FIFO to a corresponding receiving FIFO. By operating the control paths in parallel in the predetermined sequence, the system does not have to wait a request-acknowledge cycle time between the sender and the receiver before sending consecutive data items through the shared data path, but can instead send multiple data items through the shared data path within a single request-acknowledge cycle time.

21 Claims, 8 Drawing Sheets

APPARATUS AND METHOD FOR HIGH-THROUGHPUT ASYNCHRONOUS COMMUNICATION WITH FLOW CONTROL

GOVERNMENT LICENSE RIGHTS

This invention was made with United States Government support under Contract No. NBCH020055 awarded by the Defense Advanced Research Projects Administration. The United States Government has certain rights in the invention.

BACKGROUND

1. Field of the Invention

The present invention relates to communication networks. More specifically, the present invention relates to an apparatus and a method for high-throughput asynchronous communication over high-latency communication channels.

2. Related Art

Dramatic increases in computational speed in recent years have largely been facilitated by improvements in semiconductor integration densities, which presently allow hundreds of millions of transistors to be integrated into a single semiconductor chip. This makes it possible to incorporate a large amount of computational circuitry onto a semiconductor chip. Moreover, the small circuit dimensions made possible by improved integration densities have enabled this computational circuitry to operate at greatly increased speeds. While computational circuitry within semiconductor chips continues to grow increasingly faster, the delay involved in communicating data between semiconductor chips has not decreased significantly. Consequently, communication delay is beginning to create a significant bottleneck to computer system performance.

Figure 1:
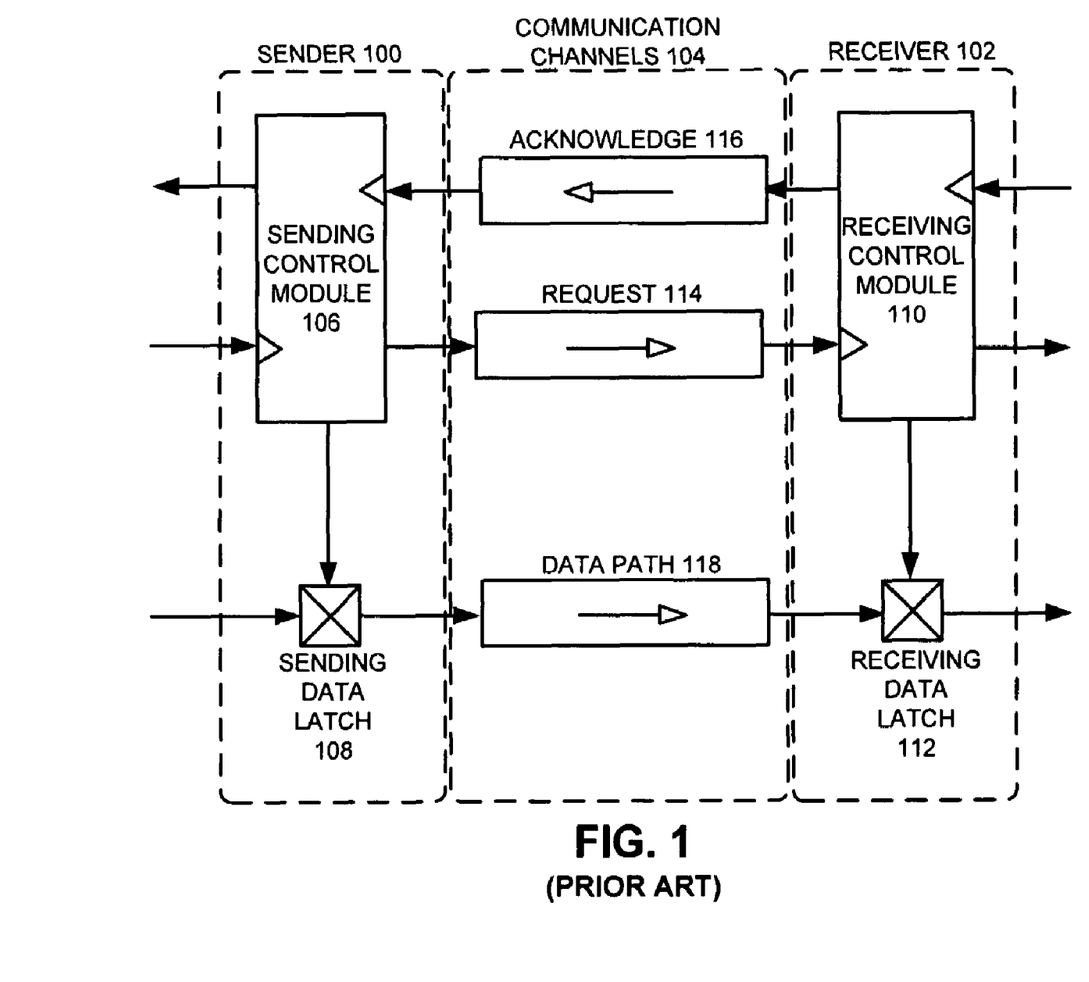
FIG. 1 illustrates a typical communication system that includes a sender, a receiver and communication channels in accordance with an embodiment of the present invention.

For example, FIG. 1 illustrates a typical communication system that includes sender 100, receiver 102, and communication channel 104, wherein sender 100 comprises sending control module 106 and sending data latch 108, and wherein receiver 102 comprises receiving control module 110 and receiving data latch 112. The control modules 106 and 110 have inputs marked with triangles, and outputs, which have no triangles. Sending control module 106 is coupled to receiving control module 110 through request line 114 and acknowledge line 116. Sending data latch 108 is coupled to receiving data latch 112 through data path 118. Request line 114, acknowledge line 116, and data path 118 are collectively referred to as "communication channels" 104.

During operation, when data is available in sending data latch 108 and data path 118 is free, sending control module 106 sends a request signal on request line 114 and simultaneously causes sending data latch 108 to send a data item onto data path 118. After a transit time, the request signal and the data item arrive at receiving control module 110 and receiving data latch 112, respectively.

In response to the request signal, if the downstream channel is available, receiving control module 110 causes the data to be latched into receiving data latch 112 and simultaneously sends an acknowledge signal on acknowledge line 116. After an additional transit time, the acknowledge signal arrives at sending control module 106, which causes sending control module 106 to send a subsequent data item from sending data latch 108 onto data path 118. Note that above steps can be repeated.

Unfortunately, the above-described communication scheme has a serious drawback. The data rate of the communication channels is restricted by a request-acknowledge cycle time required to send a request signal and to receive a corresponding acknowledge signal for each data item. Note that while the acknowledge signal is in-flight, data path 118 is idle. Thus, data path 118 is busy at most half of the time, and is hence significantly underutilized.

In order to alleviate this problem, a previous invention described alternately using two sets of control paths to asynchronously control transmission of consecutive data items between the sender and the receiver, thereby allowing an improved data rate up to twice as high as the implementation illustrated in FIG. 1. However, this technique does not provide a solution for a communication system that requires an even higher data rate.

Hence, what is needed is an apparatus and a method for high-throughput asynchronous communication between a sender and a receiver without the above-described limitation.

SUMMARY

One embodiment of the present invention provides a system that asynchronously controls sending data items from a sender to a receiver. This system includes a set of sending first-in-first-out buffers (FIFOs), a set of receiving FIFOs, as well as a shared data path between the sender and the receiver. The system also includes a set of control paths that operate in parallel between the sender and the receiver, wherein a given control path controls the transmission of data items between a corresponding sending FIFO and a corresponding receiving FIFO through the shared data path. The system further includes a round-robin scheduling mechanism which activates one control path at a time in a predetermined sequence. An activated control path asynchronously controls the sending of a data item from a corresponding sending FIFO to a corresponding receiving FIFO. By operating the control paths in parallel in the predetermined sequence, the system does not have to wait a request-acknowledge cycle time between the sender and the receiver before sending consecutive data items through the shared data path, but can instead send multiple data items through the shared data path within a single request-acknowledge cycle time.

In a variation on this embodiment, each control path comprises a sending control module which generates a request signal, a receiving control module which generates an acknowledge signal, a request control path which carries the request signal from the sending control module to the receiving control module, and an acknowledge control path which returns the acknowledge signal from the receiving control module to the sending control module. In this variation, the sending control module is controlled by the round-robin scheduling mechanism.

In a variation on this embodiment, the sending control module is coupled to a sending data latch in a corresponding sending FIFO while the receiving control module is coupled to a receiving data latch in a corresponding receiving FIFO.

In a variation on this embodiment, the sending control module activates the sending data latch upon receiving the acknowledge signal from the receiving control module and when the sending control module is activated by the round-robin scheduling mechanism. Activating the sending data latch causes a subsequent data item in the corresponding sending FIFO to be sent onto the shared data path.

In a variation on this embodiment, the receiving control module provides data underflow protection in the control path by not acknowledging a request to output data when no data is available in the receiving FIFO and by keeping the data latch at the output of the FIFO inactive.

In a variation on this embodiment, the sending control module provides data overflow protection in the control path by not acknowledging a request to input data when the sending FIFO is full and by keeping the data latch at the input of the FIFO inactive.

In a variation on this embodiment, the round-robin scheduling mechanism activates consecutive control paths at an activation interval, wherein the activation interval is less than the request-acknowledge cycle time, and the activation interval multiplied by the number of control paths is greater than or equal to the request-acknowledge cycle time.

In a variation on this embodiment, the sending and receiving control modules are implemented using GasP modules.

In a variation on this embodiment, each of the control signals is a differential signal sent through two wires.

In a variation on this embodiment, each control path provides underflow and overflow protections on the shared data path.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

High-Throughput Asynchronous Communication

Figure 2:
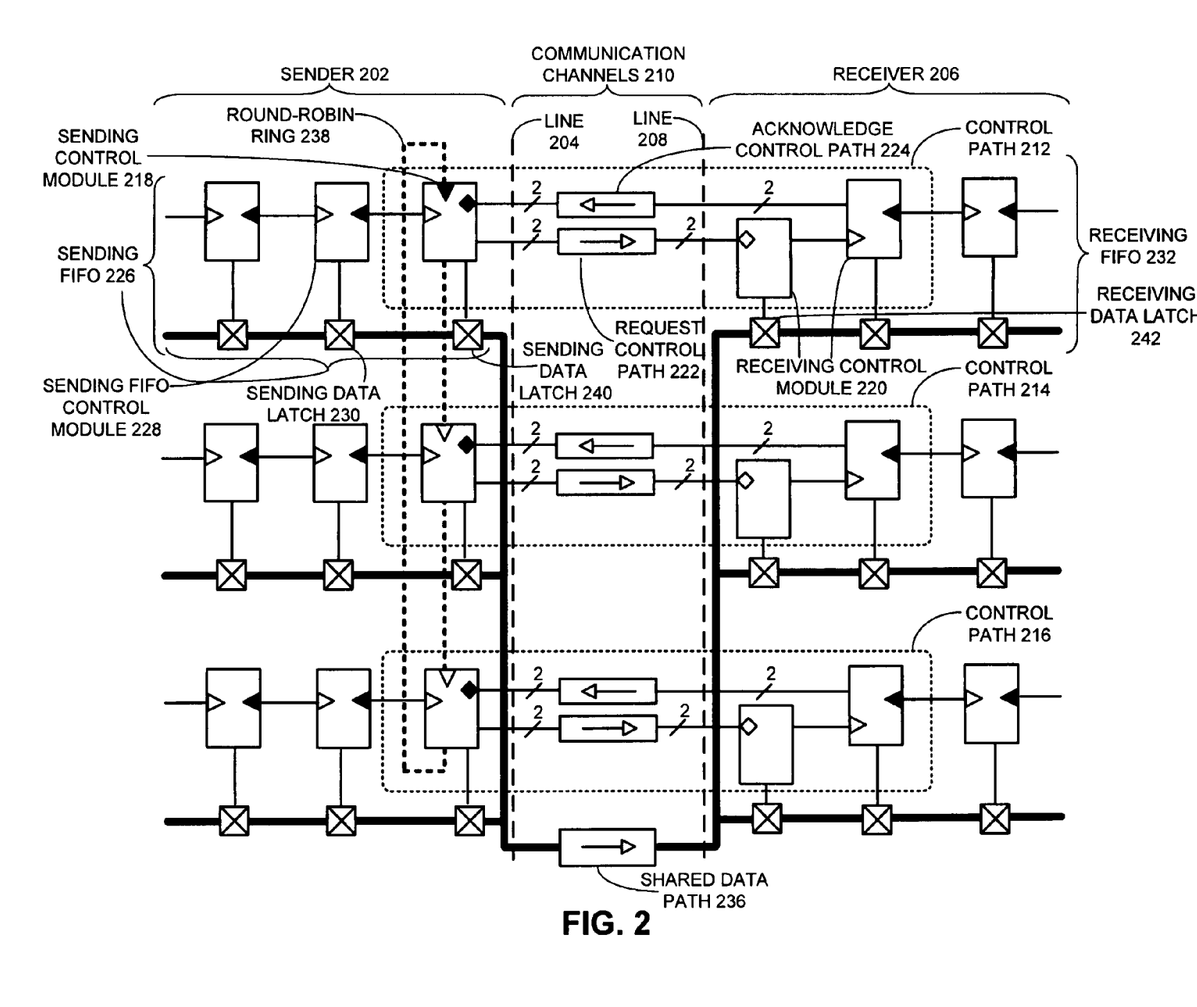
FIG. 2 illustrates a high-throughput asynchronous communication system in accordance with an embodiment of the present invention.

FIG. 2 illustrates a high-throughput asynchronous communication system in accordance with an embodiment of the present invention.

From left to right in FIG. 2, the system has a sender 202 which includes all the components to the left of dash line 204, and a receiver 206 which includes all the components to the right of dash line 208. Sender 202 and receiver 206 communicate through communication channels 210 which include all the components between dash lines 204 and 208.

From top to bottom in FIG. 2, the system includes a set of three control paths 212, 214, and 216 which operate in parallel between sender 202 and receiver 206. Each control path comprises a sending control module 218 which generates a request signal, a receiving control module 220 which generates an acknowledge signal, a request control path 222 which carries the request signal from sending control module 218 to receiving control module 220, and an acknowledge control path 224 which returns the acknowledge signal from receiving control module 220 to sending control module 218.

Sender 202 further includes three sets of sending first-in first-out buffers (FIFOs) 226 which facilitate queuing and temporarily storing data items for transmission. In one embodiment in FIG. 2, sending FIFO 226 comprises three stages, and data items propagate from left to right through these stages. Each stage of sending FIFO 226 further comprises a sending FIFO control module 228 which is coupled to a sending data latch 230. Note that the sending FIFO control module in the last stage of sending FIFO 226 is also sending control module 218.

Receiver 206 includes three sets of receiving FIFO 232 which facilitate queuing and temporarily storing the data items received from sending FIFO 226. Note that the first stage of receiving FIFO 232 includes receiving control module 220, which additionally comprises two components. In one embodiment in FIG. 2, receiving FIFO 232 comprises three stages, and the data items propagate from left to right through these stages.

In the system in FIG. 2, a given control path controls the transmission of data items between a corresponding sending FIFO and a corresponding receiving FIFO by using a corresponding sending control module, a corresponding receiving control module, and corresponding request and acknowledge control paths.

The system further includes a shared data path 236 between sender 202 and receiver 206 which is shared by control paths 212, 214, and 216. Specifically, all three sending control modules transmit corresponding data items to the corresponding receiving control modules through shared data path 236.

In the heart of the system is a round-robin ring 238 which couples together control paths 212, 214 and 216 through the corresponding sending control modules in the control paths. During operation, round-robin ring 238 activates one control path at a time in a predetermined sequence. For example, round-robin ring 238 activates the control paths 212, 216, 214 sequentially and repeats the sequence indefinitely. In this fashion, round-robin ring 238 ensures that one sending FIFO at a time can send a data item onto shared data path 236. Meanwhile, an activated control path asynchronously controls the sending of a data item from the corresponding sending FIFO to the corresponding receiving FIFO. Note that, the asynchronous control of each control path ensures that the request-acknowledge cycle time between sending consecutive data items by each control path is still the latency between sending a request signal and receiving a corresponding acknowledge signal, which does not change. In other words, each control path in FIG. 2 behaves like the communication system in FIG. 1. On the other hand, once a data item is sent onto the shared data path, the system does not have to wait the request-acknowledge cycle time of each control path before sending the next data item onto the shared data path. Instead, the round-robin ring activates consecutive control paths at an activation interval less than the request-acknowledge cycle time, which facilitates sending multiple data items through the shared data path within a single cycle time, while the multiple data items are controlled by their corresponding parallel control paths asynchronously.

Note that the system achieves high-throughput through aggregation of multiple control paths. The number of aggregated control paths determines the throughput. In one embodiment of the present invention, the activation interval which is the interval between consecutive data items on the shared data path, is a constant. In this embodiment, each control path in the set of control paths is activated once during a round-robin cycle. Consequently, if the round-robin cycle time is at least the request-acknowledge cycle time, then the round-robin cycle time divided by the number of control paths determines the activation interval. For example, the three control paths in the embodiment illustrated in FIG. 2 imply that the activation interval is ⅓ of the round-robin cycle time. Hence the data rate and throughput is 3 times those of a simple communication system with only one control path. It will be apparent to one with ordinary skills in the art that more aggregation of control paths subsequently facilitates even higher throughput. In designing the system, the number of parallel control paths to be used may be determined in accordance to a system throughput requirement.

During operation, sending control module 218 activates sending data latch 240 upon receiving a request signal from control module 228, and upon receiving the acknowledge signal from receiving control module 220, and when sending control module 218 is activated by round-robin ring 238. Upon activation, sending data latch 240 causes the last data item in sending FIFO 226 to be sent onto shared data path 236. On the receiver side, the data item is captured in receiving data latch 242 in receiving FIFO 232 some fixed delay later. Note the asymmetric designs of sending control module 218 and receiving control module 220. The asymmetry is desired for flow control purpose which will be described later.

Also note that sending and receiving control modules are implemented using GasP modules. For example, GasP module 218 is used in the sending FIFO and the two GasP modules 220 are used in the receiving FIFO. GasP modules are selected, because they are fast and efficient asynchronous controllers. The design of a GasP module is described in more detail below with reference to FIGS. 6-8.

Differential Signaling

The request and acknowledge signaling between sending control module 218 and receiving control module 220 in control path 212 uses two-phase signaling on two wires, wherein the two wires carry a differential signal. Each connection that uses two-phase signaling is labeled with a "2" in FIG. 2.

Note that in the two-phase signaling scheme, for each request or acknowledge signal sent, each wire transitions only once (either "up" or "down") with each communication, whereas in four-phase signaling, each communication requires two transitions per wire. Using two wires allows sending a control signal as differential signals, thereby facilitating noise cancellation during transmission. Additionally, using two wires provides a return path for the current. Furthermore, the combination of two wires carrying the differential signal and two-phase signaling also simplifies some of the logic in the circuit and avoids using expensive gates like XOR gates.

Figure 3A:
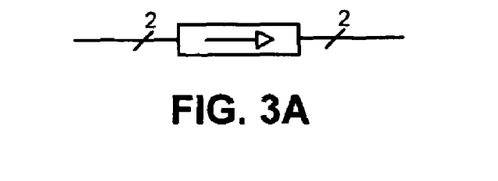
FIG. 3A illustrates a schematic diagram of a request control path in accordance with an embodiment of the present invention.
Figure 3B:
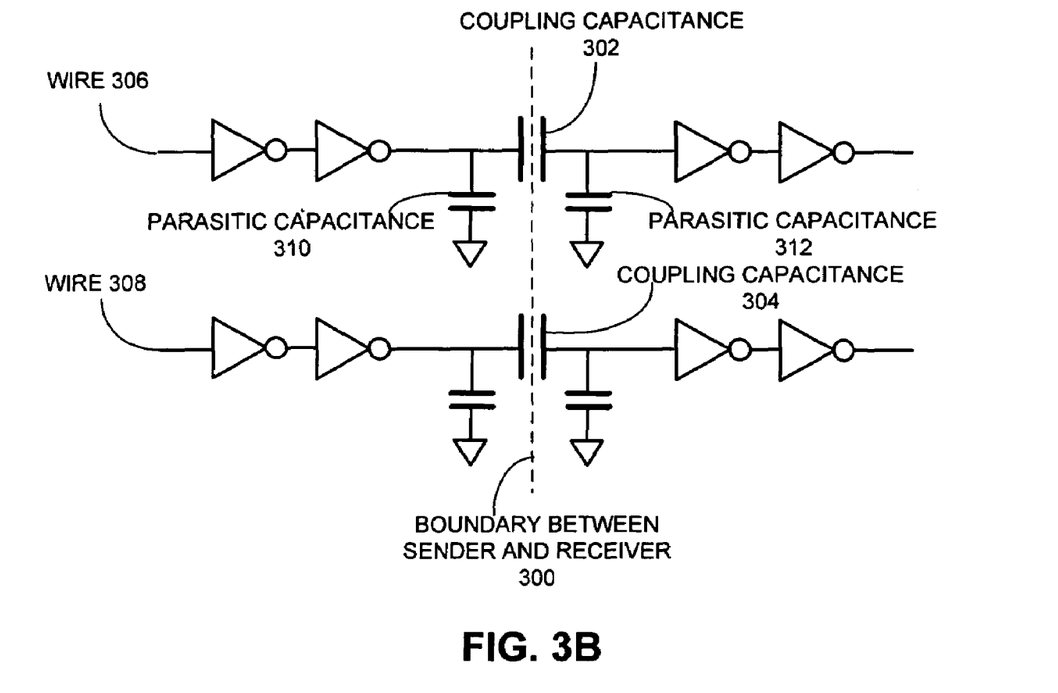
FIG. 3B illustrates an implementation of a request control path using two wires and circuit components in accordance with an embodiment of the present invention.

FIGS. 3A and 3B illustrate an implementation of communication channels 210 in accordance with an embodiment of the present invention. More specifically, FIG. 3A illustrates a schematic diagram of request control path 222, and FIG. 3B illustrates an implementation of request control path 222 using two wires and circuit components in accordance with an embodiment of the present invention.

In FIG. 3B, a signal is capacitively coupled across the boundary 300 between a sender and a receiver through coupling capacitances 302 and 304 in wire 306 and wire 308, respectively. The capacitances 310 and 312 before and after coupling capacitance 302 are parasitic capacitances. All these capacitances directly influence the latency of the communication channel. Each wire further includes two inverters before the coupling capacitance and two inverters after the coupling capacitance. With proper sizing, the two inverters before the coupling capacitance drive the large parasitic and coupling capacitances with little delay, and the two inverters after the coupling capacitance amplify a small signal swing to a full signal swing with little delay.

In FIG. 3B differential signaling on wires 306 and 308 is implemented by means of complementary signals that both change at the same time. Here, both wires have separate amplifying inverters. Alternatively, the amplifying inverters from the two wires can be replaced by differential amplifiers.

Flow Control

The control paths have special precautions to ensure proper flow control, which includes both FIFO underflow and overflow protection. During operation, FIFO underflow protection ensures that a FIFO does not output invalid data items when the FIFO is empty, while FIFO overflow protection ensures that a FIFO does not input data items when the FIFO is full.

For example in FIG. 2, sending control module 218 provides FIFO overflow protection in the control path by not acknowledging a request to input data and keeping data latch 240 inactive when the FIFO is full. The use of GasP modules in the configuration of FIG. 2 guarantees such overflow protection.

Figure 4A:
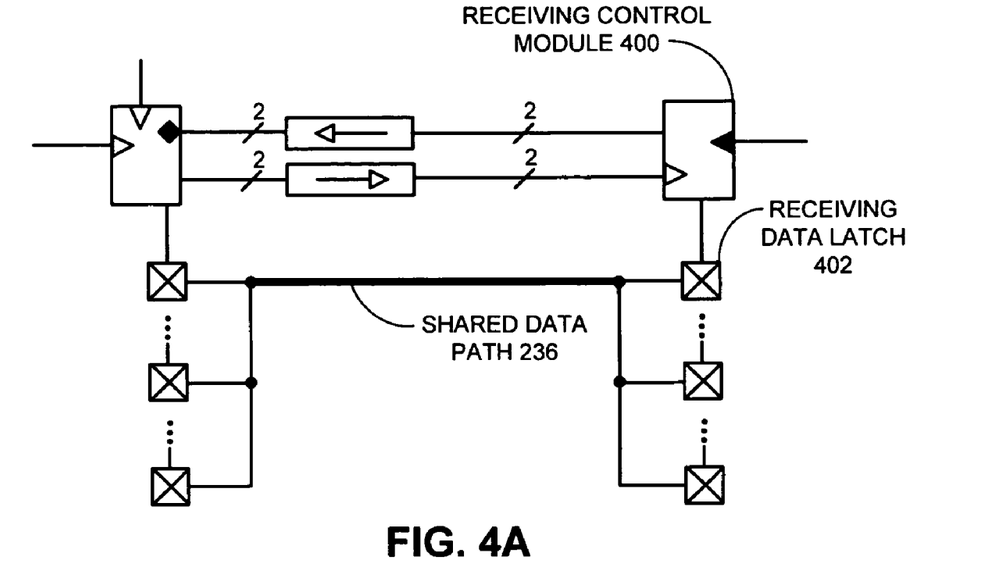
FIG. 4A illustrates an obvious but erroneous implementation of a control path that does not provide FIFO overflow protection.
Figure 4B:
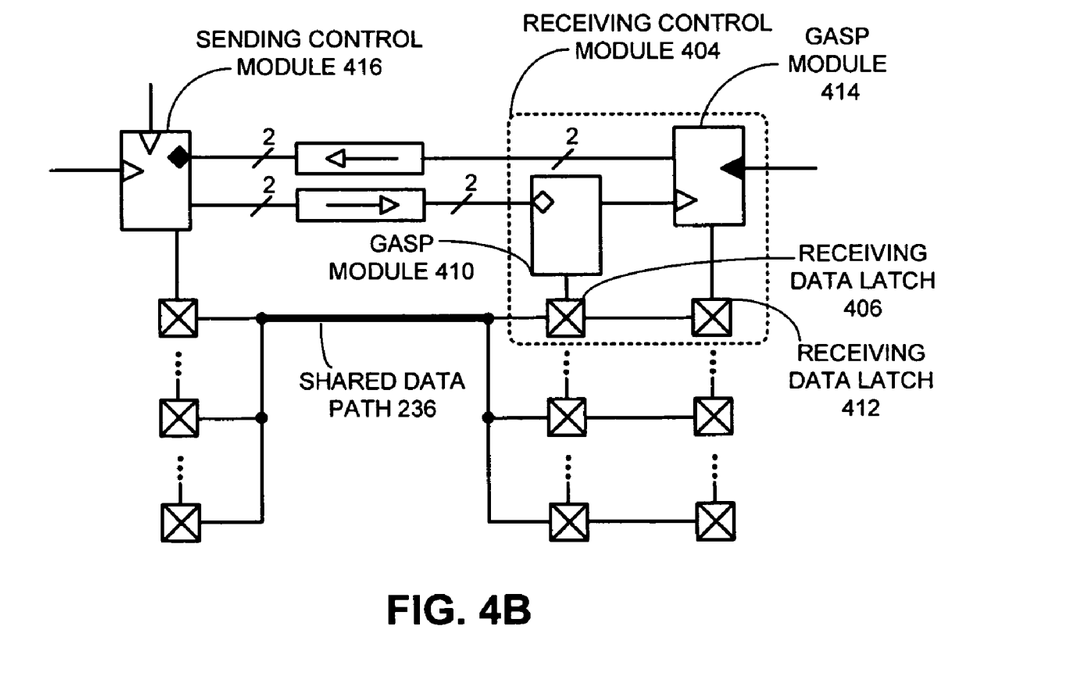
FIG. 4B illustrates a control path implementation that provides FIFO overflow protection in the control path in accordance with an embodiment of the present invention.

FIGS. 4A and 4B illustrate how to guarantee FIFO overflow protection in the control path in accordance with an embodiment of the present invention. More specifically, FIG. 4A illustrates an obvious but erroneous implementation of the control path that does not provide FIFO overflow protection. During operation, assume a data item arrives at receiving data latch 402 and corresponding request arrives at GasP module 400. If the next FIFO stage, which is the stage associated with GasP module 400, is empty, then GasP module 400 will activate latch 402 and the data will be latch in the next FIFO stage. Furthermore, GasP module 400 issues an acknowledge signal to the sending FIFO, which means that the sending FIFO can send the next data item. This acknowledge signal is issued even if the receiving FIFO has become full. If such a scheme is used with the implementation illustrated in FIG. 2, in a case that all receiving FIFOs are full upon receiving a data item, each of the three sets of sending FIFOs can still send a data item on shared data path 236, one at a time. Because no receiving FIFO can accept another data item, all three data items must remain on the shared data path 236. Consequently, the first two data items will be overwritten by the third data item on shared data path 236 and will be lost in transmission.

FIG. 4B illustrates the control path implementation used in FIG. 2 that provides FIFO overflow protection in the control path in accordance with an embodiment of the present invention. In FIG. 4B, receiving control model 404 comprises the first two stages of the receiving FIFO instead of just one stage as in FIG. 4A. Note that the receiving data latch 406 is normally empty. During operation, a data item arriving at receiving data latch 406 will be latched. If the FIFO stage associated with GasP module 414 is not full, GasP module 414 passes the data item onto downstream receiving data latch 412 upon receiving the request signal associated with the data item, which then causes GasP module 414 to issue an acknowledge signal. On the other hand, if the FIFO stage associated with GasP module 414 is full after receiving a data item, the data item remains latched in receiving data latch 406, and therefore cannot cause GasP module 414 to issue an acknowledge signal. This subsequently prevents sending control module 416 from sending another data item onto the shared data path 236 until the FIFO stage full condition is cleared. Hence, the receiving control module 404 provides data overflow protection in the control path by not issuing an acknowledge signal for the last data item, if the data item arrives at the receiver when the receiving FIFO stage associated with GasP module 414 is full.

Implementation of Control Path

Figure 5:
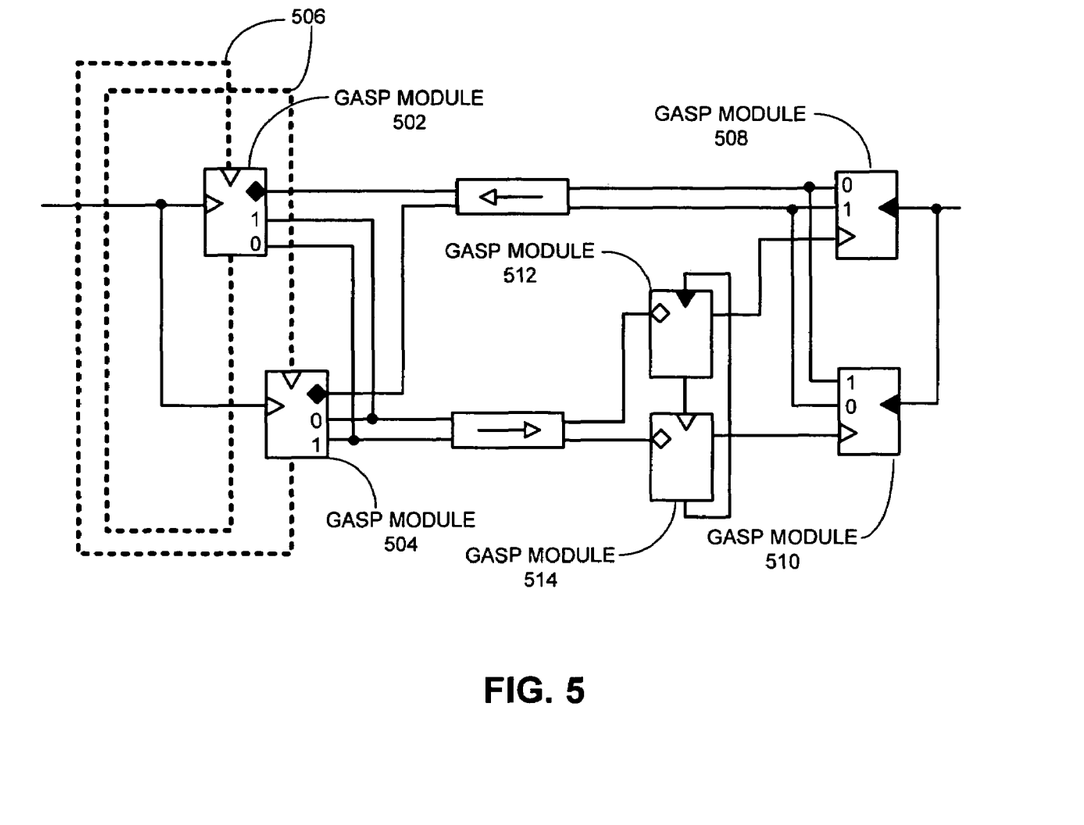
FIG. 5 illustrates an implementation of a control path using GasP modules that have complementary wires as inputs and outputs in accordance with an embodiment of the present invention.

FIG. 5 illustrates an implementation of a control path using GasP modules that have complementary wires as inputs and outputs in accordance with an embodiment of the present invention.

Sending control module 416 in FIG. 4B is implemented using two GasP modules 502 and 504. These two GasP modules are connected to a round-robin ring by means of dashed lines 506. The round-robin ring ensures that the two GasP modules fire alternately. The right GasP module 414 in FIG. 4B is also implemented using two GasP modules 508 and 510, and the middle GasP module 410 in FIG. 4B is similarly implemented using two GasP modules 512 and 514. In FIG. 5, GasP modules 502, 504, 508, and 510 with two outputs labeled 0 and 1 means that upon firing the GasP modules set the output labeled 0 to 0 and simultaneously the output labeled 1 to 1. Following the firings of the GasP modules in FIG. 5 and assuming that module 502 fires first, the following firing sequence will repeat indefinitely:

502→512→508→504→514→510.

GasP Module Implementations

Figure 6A:
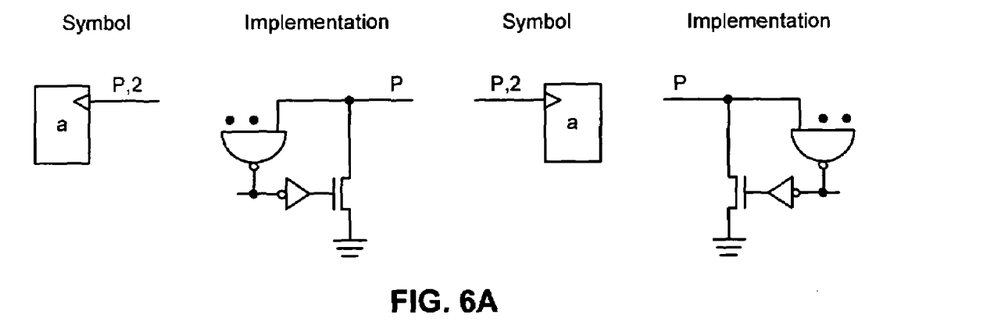
FIG. 6A illustrates a type of terminal connection for a GasP module with a time separation of two gate delays between firings of modules in accordance with an embodiment of the present invention.
Figure 6B:
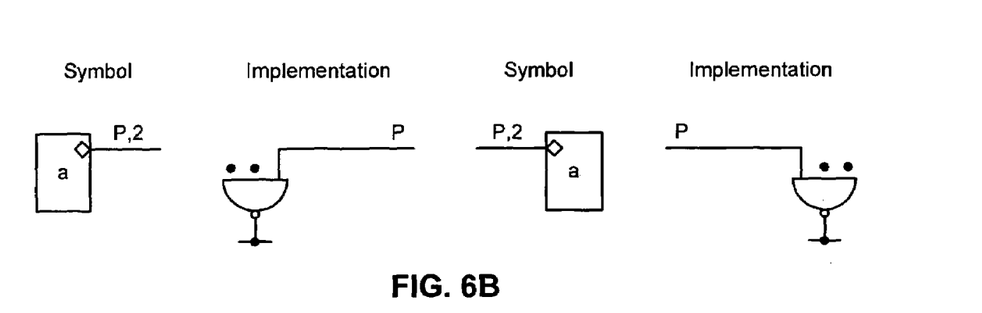
FIG. 6B illustrates another type of terminal connection for a GasP module with a time separation of two gate delays between firings of modules in accordance with an embodiment of the present invention.
Figure 6C:
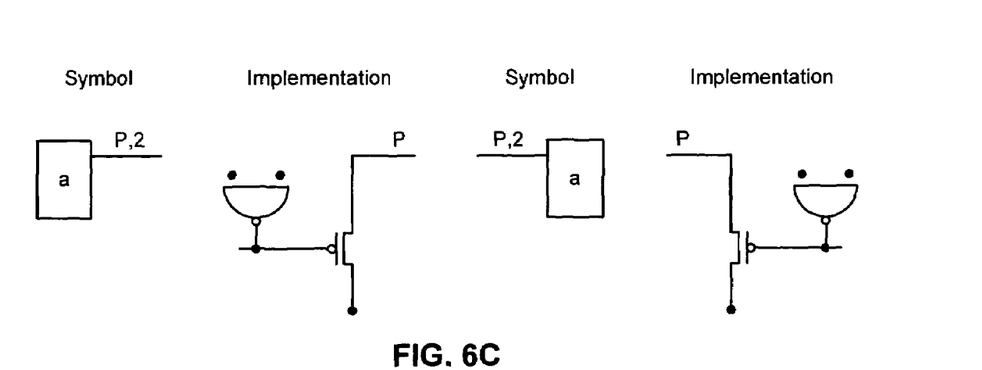
FIG. 6C illustrates yet another type of terminal connection for a GasP module with a time separation of two gate delays between firings of modules in accordance with an embodiment of the present invention.
Figure 7A:
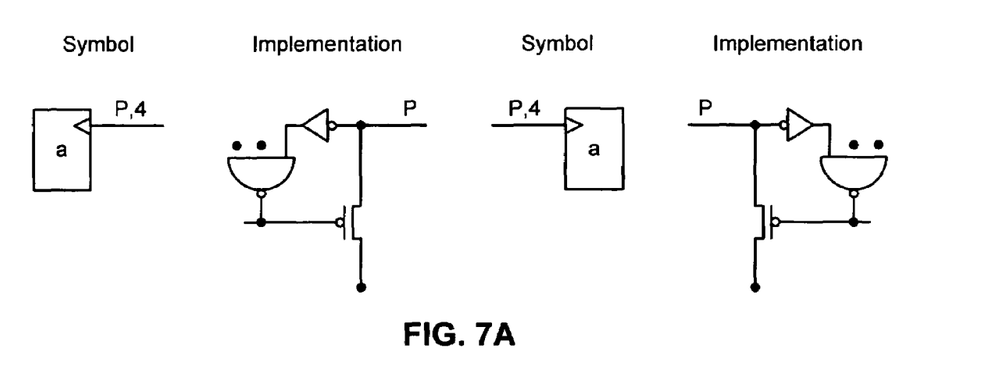
FIG. 7A illustrates a type of terminal connection for a GasP module with a time separation of four gate delays between firings of modules in accordance with an embodiment of the present invention.
Figure 7B:
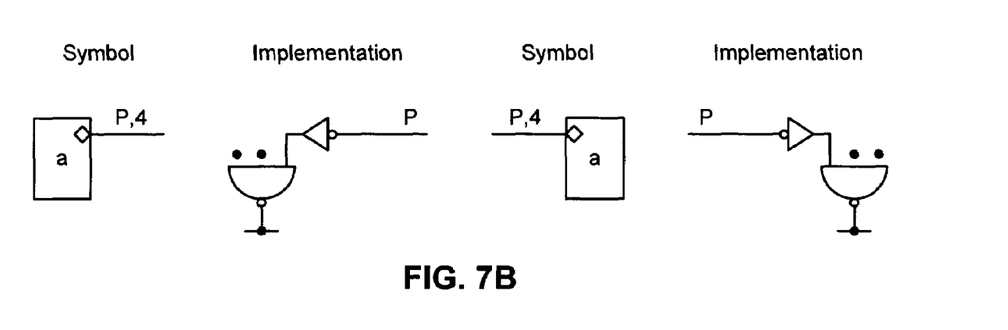
FIG. 7B illustrates another type of terminal connection for a GasP module with a time separation of four gate delays between firings of modules in accordance with an embodiment of the present invention.
Figure 7C:
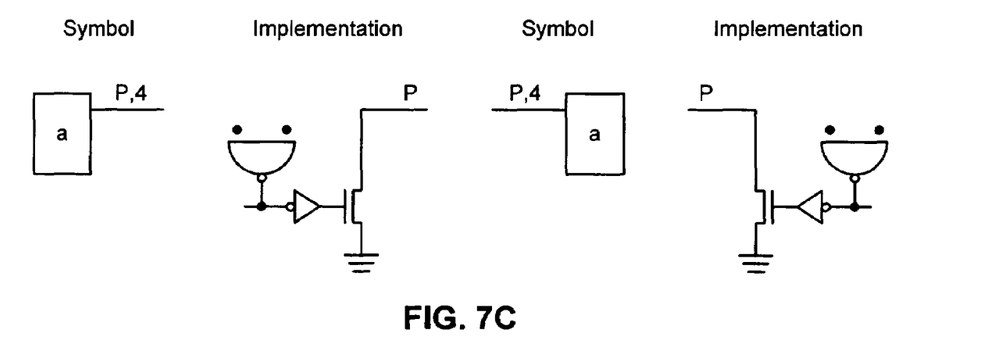
FIG. 7C illustrates yet another type of terminal connection for a GasP module with a time separation of four gate delays between firings of modules in accordance with an embodiment of the present invention.

We denote a GasP module by means of a rectangular box with a label inside and a series of connections. The label denotes the event that is associated with the GasP module. Each GasP module can have three different types of connections. FIGS. 6 and 7 give the three types of connections of a GasP module together with their 2-4 GasP implementations. FIG. 6 shows the symbols and their implementations for connections between GasP modules where the time separation between the "firings" of two modules is two gate delays. FIG. 7 shows the symbols and their implementations for connections between GasP modules where the time separation between the "firings" of two modules is four gate delays. Both figures show connections attached to the left and the right of a GasP module. Apart from a reflection, the implementations of the left-side and right-side connections are the same.

FIG. 6A illustrates a GasP module with a so-called self-resetting input. FIG. 6B shows a GasP module with a so-called non-resetting input. FIG. 6C illustrates a GasP module with an output. Common in all GasP module implementations is a NAND gate. To complete the implementation of the GasP Module, circuitry is added to the NAND gate for each connection. When all inputs of a GasP module are set, which means HI in the implementations of FIGS. 6A and 6B, the NAND gate will eventually "fire," i.e., go LO. The firing of the NAND gate defines the occurrence of the event. After the NAND gate fires, a pull-down transistor resets each self-resetting input. The non-resetting input has no reset capability. When the NAND gate fires, the pull-up transistor sets the output.

FIG. 7 illustrates the same ideas as in FIG. 6, except that now "setting" and "resetting" are implemented differently. Here, an input is set when the input is LO. Thus, resetting an input happens by means of a pull-up transistor, and setting an output happens by means of a pull-down transistor.

Each connection is implemented as a tri-state wire with a keeper. A tri-state wire is a wire that is either "driven HI", "driven LO", or "not driven." To avoid clutter, connections in schematics appear as lines between GasP modules, and keepers are not shown. When a connection is driven HI or LO, the connection will be driven for a short period only, a period that is long enough to set the keeper and wire HI or LO. The keeper will then keep the state of the connection when the wire is not driven. Using the GasP implementations of FIGS. 6 and 7, the period that a wire is driven is about three gate delays. Notice that each pull-down or pull-up transistor conducts for a period of about three gate delays.

In order for these implementations to work properly, all transistors must be properly sized. Here, this means that all gates must have the same step-up ratio, i.e., the ratio between each gate's drive strength and output load is the same. When properly sized, each gate has about the same delay, and thus we can justifiably speak about units of delay between any two events.

Figure 8A:
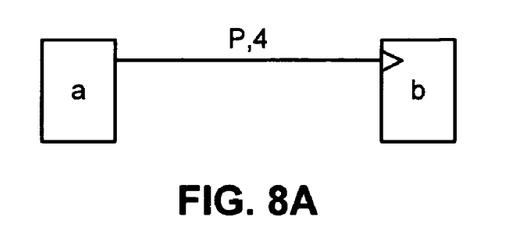
FIG. 8A is a symbolic representation of a connection between GasP modules with a delay of four units between two events in accordance with an embodiment of the present invention.
Figure 8B:
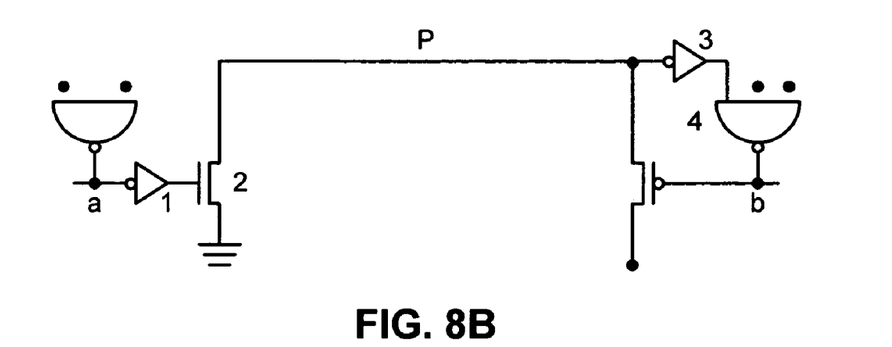
FIG. 8B illustrates corresponding circuitry for a connection between GasP modules with a delay of four units between two events in accordance with an embodiment of the present invention.
Figure 8C:
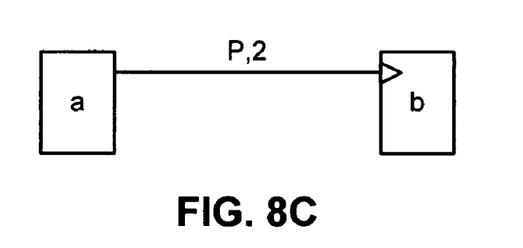
FIG. 8C is a symbolic representation of a connection between GasP modules with a delay of two units between two events in accordance with an embodiment of the present invention.
Figure 8D:
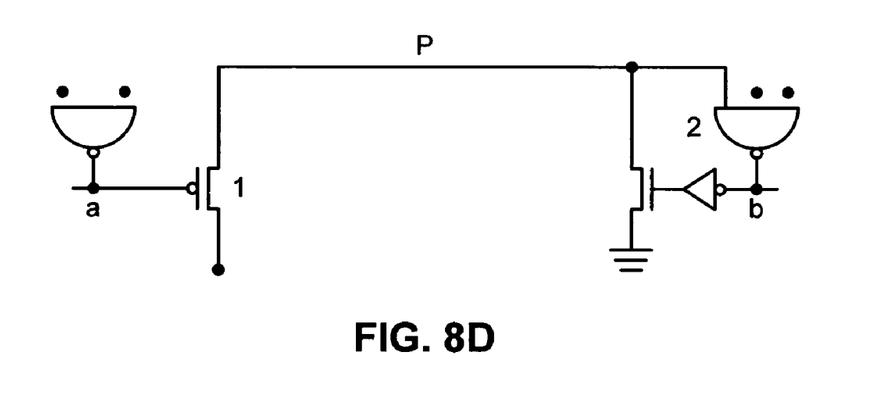
FIG. 8D illustrates corresponding circuitry for a connection between GasP modules with a delay of two units between two events in accordance with an embodiment of the present invention.

The label P on the connections to the GasP modules in FIGS. 6 and 7 gives a name to the connections and is often associated with the name of the state to which the connection corresponds. The labels 2 and 4 indicate whether the implementation of the connection must realize a time separation of two or four gate delays, respectively, between firings of successive GasP modules. FIG. 8 illustrates this idea. FIG. 8A shows a simple connection between GasP modules and FIG. 8B shows its implementation. The label 4 indicates that the connection must realize time separation of four gate delays between the firings of modules a and b. Notice that between node a going LO and node b going LO in FIG. 8B there are four gate delays. Similar remarks can be made for FIGS. 8C and 8D, where the label 2 denotes a time separation of two gate delays. The labels 2 and 4 will come in handy later when we want to calculate cycle times in GasP networks.

In an implementation we indicate the initial state of each connection by darkening the arrowheads or diamonds inside the modules that are associated with the connection. A connection with a darkened arrowhead or diamond is initially set, that is, the connection is initialized HI when the connection has the label 2 and initialized LO when the connection has the label 4.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that asynchronously controls sending data items from a sender to a receiver in a communication system, comprising:
    a set of sending FIFOs;
    a set of receiving FIFOs;
    a shared data path between the sender and the receiver;
    a set of control paths that operate in parallel between the sender and the receiver, wherein each of the control paths comprises a separate request-acknowledge mechanism for communicating request-acknowledge signals, and wherein a given control path controls the transmission of data items between a corresponding sending FIFO and a corresponding receiving FIFO through the shared data path; and
    a round-robin scheduling mechanism configured to activate one control path at a time in a predetermined sequence, wherein an activated control path asynchronously controls the sending of a data item from a corresponding sending FIFO to a corresponding receiving FIFO, and wherein the round-robin scheduling mechanism activates consecutive control paths at an activation interval, wherein the activation interval multiplied by the number of the set of control paths is greater than or equal to the request-acknowledge cycle time;
    wherein by operating the control paths in parallel in the predetermined sequence, the apparatus does not have to wait a request-acknowledge cycle time between the sender and the receiver before sending consecutive data items through the shared data path, but instead sends multiple data items through the shared data path within a single request-acknowledge cycle time.

2. The apparatus of claim 1, wherein each control path comprises:
    a sending control module configured to generate a request signal;
    a receiving control module configured to generate an acknowledge signal;
    a request control path configured to carry the request signal from the sending control module to the receiving control module; and
    an acknowledge control path configured to return the acknowledge signal from the receiving control module to the sending control module;
    wherein the sending control module is controlled by the round-robin scheduling mechanism.

3. The apparatus of claim 2:
    wherein the sending control module is coupled to a sending data latch in a corresponding sending FIFO; and
    wherein the receiving control module is coupled to a receiving data latch in a corresponding receiving FIFO.

4. The apparatus of claim 3:
    wherein the sending control module is configured to activate the sending data latch upon receiving the acknowledge signal from the receiving control module and when the sending control module is activated by the round-robin scheduling mechanism; and
    wherein activating the sending data latch causes a subsequent data item in the corresponding sending FIFO to be sent onto the shared data path.

5. The apparatus of claim 3, wherein the receiving control module is configured to provide data underflow protection in the control path by not acknowledging a request to output data and by keeping the output data latch inactive when the receiving FIFO is empty.

6. The apparatus of claim 3, wherein the sending control module is configured to provide data overflow protection in the control path by not acknowledging a request to input data and by keeping the input data latch inactive when the sending FIFO is full.

7. The apparatus of claim 1,
    wherein the activation interval is less than the request-acknowledge cycle time.

8. The apparatus claim 2, wherein the sending and receiving control modules are implemented using GasP modules.

9. The apparatus claim 2, wherein each of the control signals is a differential signal sent through two wires.

10. The apparatus of claim 1, where each control path is configured to provide underflow and overflow protections on the shared data path.

11. A computer system that asynchronously controls sending of data items from a sender to a receiver in a communication system, comprising:
    a processor;
    a memory;
    a set of sending FIFOs;
    a set of receiving FIFOs;
    a shared data path between the sender and the receiver;
    a set of control paths that operate in parallel between the sender and the receiver, wherein each of the control paths comprises a separate request-acknowledge mechanism for communicating request-acknowledge signals, and wherein a given control path controls the transmission of data items between a corresponding sending FIFO and a corresponding receiving FIFO through the shared data path; and
    a round-robin scheduling mechanism configured to activate one control path at a time in a predetermined sequence, wherein an activated control path asynchronously controls the sending of a data item from a corresponding sending FIFO to a corresponding receiving FIFO and wherein the round-robin scheduling mechanism activates consecutive control paths at an activation interval, wherein the activation interval multiplied by the number of the set of control paths is greater than or equal to the request-acknowledge cycle time;

wherein by operating the control paths in parallel in the predetermined sequence, the apparatus does not have to wait a request-acknowledge cycle time between the sender and the receiver before sending consecutive data items through the shared data path, but instead sends multiple data items through the shared data path within a single request-acknowledge cycle time.

12. The computer system of claim 11, wherein each control path comprises:

a sending control module configured to generate a request signal;

a receiving control module configured to generate an acknowledge signal;

a request control path configured to carry the request signal from the sending control module to the receiving control module; and an acknowledge control path configured to return the acknowledge signal from the receiving control module to the sending control module;

wherein the sending control module is controlled by the round-robin scheduling mechanism.

13. The computer system of claim 12:

wherein the sending control module is coupled to a sending data latch in a corresponding sending FIFO; and wherein the receiving control module is coupled to a receiving data latch in a corresponding receiving FIFO.

14. The computer system of claim 13:

wherein the sending control module is configured to activate the sending data latch upon receiving the acknowledge signal from the receiving control module and when the sending control module is activated by the round-robin scheduling mechanism; and wherein activating the sending data latch causes a subsequent data item in the corresponding sending FIFO to be sent onto the shared data path.

15. The computer system of claim 13, wherein the receiving control module is configured to provide data underflow protection in the control path by not acknowledging a request to output data and by keeping the output data latch inactive when the receiving FIFO is empty.

16. The computer system of claim 13, wherein the sending control module is configured to provide data overflow protection in the control path by not acknowledging a request to input data and by keeping the input data latch inactive when the sending FIFO is full.

17. The computer system of claim 11, wherein the activation interval is less than the request-acknowledge cycle time.

18. The computer system of claim 12, wherein the sending and receiving control modules are implemented using GasP modules.

19. The computer system of claim 12, wherein each of the control signals is a differential signal sent through two wires.

20. The computer system of claim 11, where each control path is configured to provide underflow and overflow protections on the shared data path.

21. A method for asynchronously controlling the sending of data items from a sender to a receiver, wherein the method operates in a system which includes, a set of sending FIFOs, a set of receiving FIFOs, a shared data path between the sender and the receiver, and a set of control paths that operate in parallel between the sender and the receiver, wherein a given control path controls the transmission of data between a corresponding sending FIFO and a corresponding receiving FIFO through the shared data path, the method comprising:

activating the set of control paths in a round-robin sequence so that the control paths operate in parallel, wherein an activated control path asynchronously controls the sending of a data item from a corresponding sending FIFO to a corresponding receiving FIFO, and wherein each of the control paths comprises a separate request-acknowledge mechanism for communicating request-acknowledge signals, and wherein activating the set of control paths involves activating consecutive control paths at an activation interval, wherein the activation interval multiplied by the number of the set of control paths is greater than or equal to the request-acknowledge cycle time;

wherein by operating the control paths in parallel in the predetermined sequence, the method does not have to wait a request-acknowledge cycle time between the sender and the receiver to send the request signal and to receive the associated acknowledge signal, but instead sends multiple data items through the shared data path within a single request-acknowledge cycle time.

* * * * *

UNITED STATES PATENT AND TRADEMARK OFFICE
CERTIFICATE OF CORRECTION

| | |
|---|---|
| PATENT NO. | : 7,636,361 B1 |
| APPLICATION NO. | : 11/242113 |
| DATED | : December 22, 2009 |
| INVENTOR(S) | : Ebergen et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1069 days.

Signed and Sealed this

Ninth Day of November, 2010

David J. Kappos
*Director of the United States Patent and Trademark Office*